United States Patent
Kim et al.

(10) Patent No.: US 7,348,704 B2
(45) Date of Patent: Mar. 25, 2008

(54) ROTOR OF MOTOR AND MANUFACTURING METHOD THEREOF

(75) Inventors: Young-Kwan Kim, Gyonggi-Do (KR); Deok-Jin Kim, Gyeonggi-Do (KR); Byung-Taek Kim, Gyeonggi-Do (KR); Jin-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/338,802

(22) Filed: Jan. 25, 2006

(65) Prior Publication Data

US 2006/0284506 A1 Dec. 21, 2006

(30) Foreign Application Priority Data

Jun. 20, 2005 (KR) .................. 10-2005-0053186

(51) Int. Cl.
*H02K 21/12* (2006.01)
(52) U.S. Cl. .................. 310/156.13; 310/156.14
(58) Field of Classification Search ........... 310/156.08, 310/156.12–156.14, 156.19, 156.26
See application file for complete search history.

(56) References Cited

U.S. PATENT DOCUMENTS

| | | | | |
|---|---|---|---|---|
| 3,810,056 A | * | 5/1974 | Jereb | 335/302 |
| 4,954,736 A | * | 9/1990 | Kawamoto et al. | 310/156.21 |
| 6,034,455 A | * | 3/2000 | Goltz et al. | 310/90 |
| 6,452,383 B1 | * | 9/2002 | Goedecke | 324/207.22 |
| 2004/0195924 A1 | * | 10/2004 | Kuwert | 310/156.13 |

FOREIGN PATENT DOCUMENTS

| | | | |
|---|---|---|---|
| JP | 02-095150 | * | 4/1990 |
| KR | 1999-0028987 | | 7/1999 |
| KR | 20-0214716 | | 2/2001 |

* cited by examiner

*Primary Examiner*—Dang Le
(74) *Attorney, Agent, or Firm*—Birch, Stewart, Kolasch & Birch, LLP

(57) ABSTRACT

A rotor of a motor includes a cylindrical magnet having at least one first coupling portion at an inner circumferential surface of the cylindrical magnet; and a rotor core coupled with the cylindrical magnet, the rotor core having at least one second coupling portion at an outer circumferential surface of the rotor core, the at least one second coupling portion being engaged with the corresponding at least one first coupling portion.

14 Claims, 7 Drawing Sheets

ROTOR OF MOTOR AND MANUFACTURING METHOD THEREOF

CROSS-REFERENCE TO RELATED APPLICATION

This Nonprovisional Application claims priority under 35 U.S.C. §119(a) on patent application Ser. No. 10-2005-0053186 filed in Korea on Jun. 20, 2005, the entire contents of which are hereby incorporated by reference.

BACKGROUND OF THE INVENTION

1. Field of the Invention

The present invention relates to a motor, and particularly, to a rotor of a motor and a manufacturing method thereof which can simplify assembly operation, reduce manufacturing time and allow firm coupling of a magnet.

2. Description of the Background Art

A motor is a device for converting electric energy into kinetic energy, and is used as a power source of almost every machine. The motor is classified into a DC motor, a BLDC motor (Brush Less Direct Current Motor), an induction motor, a synchronous motor, a universal motor or the like.

In general, the BLDC motor includes a stator in which a coil winds around a laminated core, a rotor having a magnet and rotatably inserted into a through hole formed inside the stator, and a hole sensor for sensing a pole of the rotor magnet.

In the BLDC motor, the rotor is rotated by the interaction between a magnetic field generated by an electric current applied to the wound coil and a magnetic field generated by the magnet of the rotor. The hole sensor senses the pole of the magnet and controls the electric current supplied to the coil.

FIG. 1 is a sectional view illustrating a rotor of an SPM (Surface Permanent Magnet) type BLDC motor. FIG. 2 is a side view of the rotor. As illustrated therein, the rotor of the BLDC motor includes a cylindrical rotor core 100 in which a plurality of disc-shaped sheets 110 having uniform thickness are laminated to have a certain length and an outer diameter, and a plurality of curved plate-shaped magnets 200 having a certain thickness and attached to an outer circumferential surface of the rotor core 100. The disc-shaped sheet 110 is formed of silicon steel. The disc-shaped sheets 110 laminated in a cylindrical shape are fixedly coupled with each other by a welding or bolting.

There are four curved plate-shaped magnets 200. A radius of curvature of the magnet 200 corresponds to that of the rotor core 100. When the four curved plate-shaped magnets 200 are attached to the outer circumferential surface of the rotor core 100, the four curved plate-shaped magnets form a cylindrical shape. That is, the four curved plate-shaped magnets 200 completely cover the outer circumferential surface of the rotor core 100.

The curved plate-shaped magnets 200 are attached to the outer circumferential surface of the rotor core 100 by an adhesive 210. A shaft hole 120 is penetratingly formed at the center of the rotor core 100. Parts 300 and 400 indicated by a virtual line are a stator and a motor shaft, respectively.

A method for manufacturing the rotor of the BLDC motor is as follows. First, as illustrated in FIG. 3, a plurality of disc-shaped sheets 110 are manufactured by a press process and are laminated to form a cylindrical shape. The disc-shaped sheets 110 are fixedly coupled with each other by bolting or welding, and so on, thereby manufacturing the rotor core 100.

After the adhesive 210 is applied to the outer circumferential surface of the rotor core 100, the curved plate-shaped magnets 200 are attached to the outer circumferential surface of the rotor core 100. Then, the adhesive 210 is dried.

The magnets 200 are attached to the outer circumferential surface of the rotor core 100 after the curved plate-shaped magnets 200 are magnetized. The curved plate-shaped magnets 200 may be attached to the rotor core 100 and then magnetized.

However, since in the rotor of the conventional BLDC motor, several curved plate-shaped magnets 200 are adhered and fixed to the outer circumferential surface by using the adhesive 210, a series of adhering processes to adhere the curved plate-shaped magnets 200 and a process of drying the adhesive 210 are required, thereby increasing the manufacturing time. Accordingly, assembly productivity of the rotor of the motor is significantly deteriorated.

In addition, since the curved plate-shaped magnets 200 are attached to the outer circumferential surface of the rotor core 100 by the adhesive 210, the defective adhering of curved plate-shaped magnets 200 is more likely to occur. In this case, the curved plate-shaped magnets 200 are apart from the rotor core 100 to cause the damage to the motor during the operation of the motor.

In addition, the rotor is inserted into the through hole of the stator. The narrower an interval between the outer circumferential surface of the rotor and an inner circumferential surface of the through hole is, the higher the motor efficiency is. However, the curved plate-shaped magnets 200 are attached to the outer circumferential surface of the rotor core 100. If there is a large amount of the adhesive 210, the adhesive 210 protrudes from between the curved plate-shaped magnets 200 and is hardened. Thus, the hardened adhesive 210 comes in contact with an inner wall of the through hole of the stator during the operation of the motor to thereby increase rotary resistance of the rotor.

SUMMARY OF THE INVENTION

Therefore, an object of the present invention is to provide a rotor of a motor and a manufacturing method thereof which can simplify assembly operation and reduce manufacturing time.

It is another object of the present invention to provide a rotor of a motor and a manufacturing method thereof which allows the firm coupling of a magnet to a rotor core and prevents the contact between the stator and the rotor.

To achieve these and other advantages and in accordance with the purpose of the present invention, as embodied and broadly described herein, there is provided a rotor of a motor, comprising: a cylindrical magnet having at least one first coupling portion at an inner circumferential surface of the cylindrical magnet; and a rotor core coupled with the cylindrical magnet, the rotor core having at least one second coupling portion at an outer circumferential surface of the rotor core, the at least one second coupling portion being engaged with the corresponding at least one first coupling portion.

To achieve these and other advantages and in accordance with the purpose of the present invention, as embodied and broadly described herein, there is provided a method for manufacturing a rotor of a motor, comprising: forming a cylindrical magnet to have at least one first coupling portion at an inner circumferential surface of the cylindrical magnet; forming a rotor core to have at least one second coupling portion at an outer circumferential surface of the rotor core; and coupling the rotor core and the cylindrical magnet so as to engage the at least one first coupling portion with the at least one second coupling portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Hereinafter, a rotor of a motor and a manufacturing method thereof in accordance with the present invention will be described in detail according to embodiments illustrated in the accompanying drawings.

Figure 1:
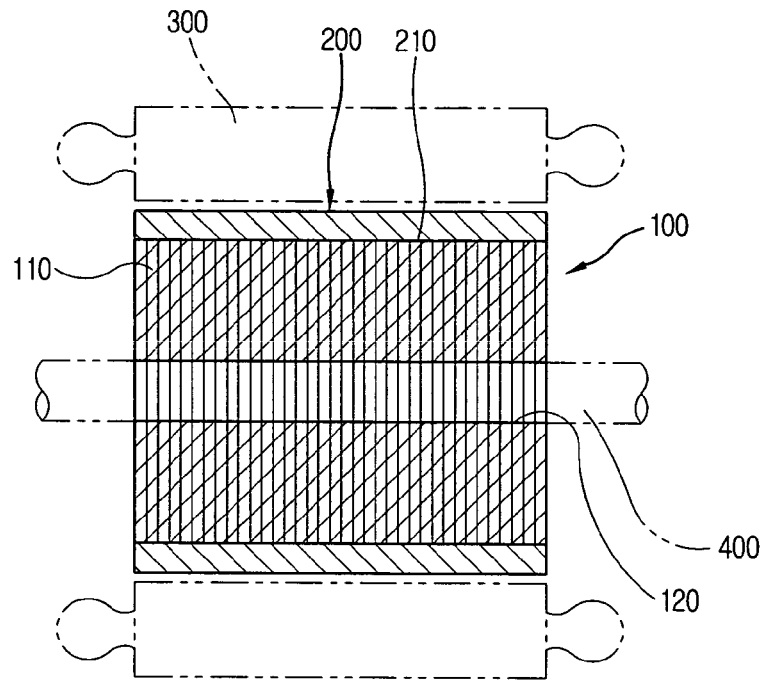
FIGS. 1 and 2 are a front sectional view and a side view illustrating a rotor of a BLDC motor in accordance with the conventional art.
Figure 2:
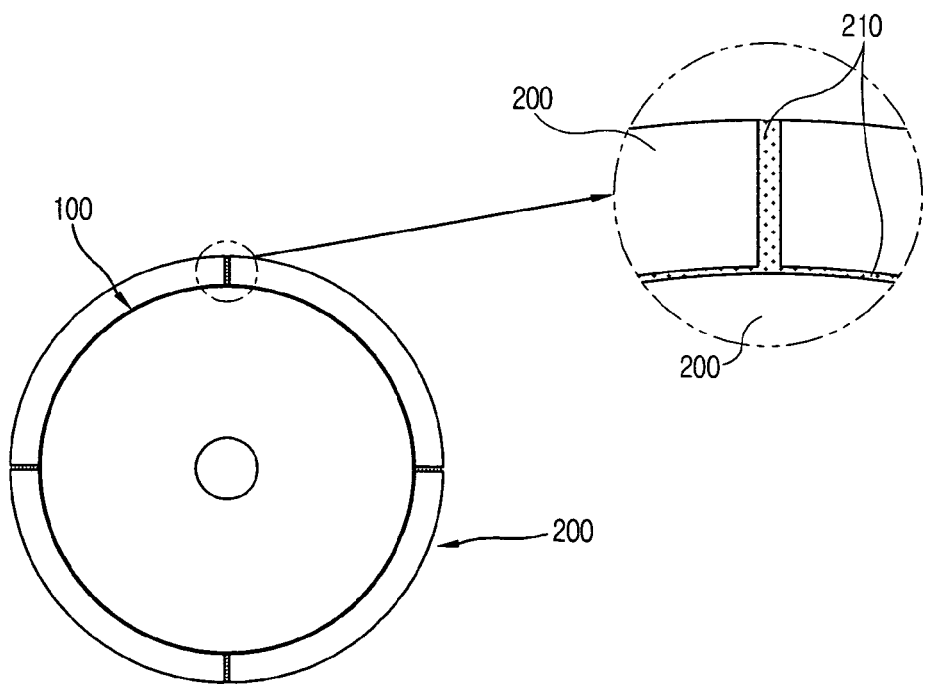
Figure 3:
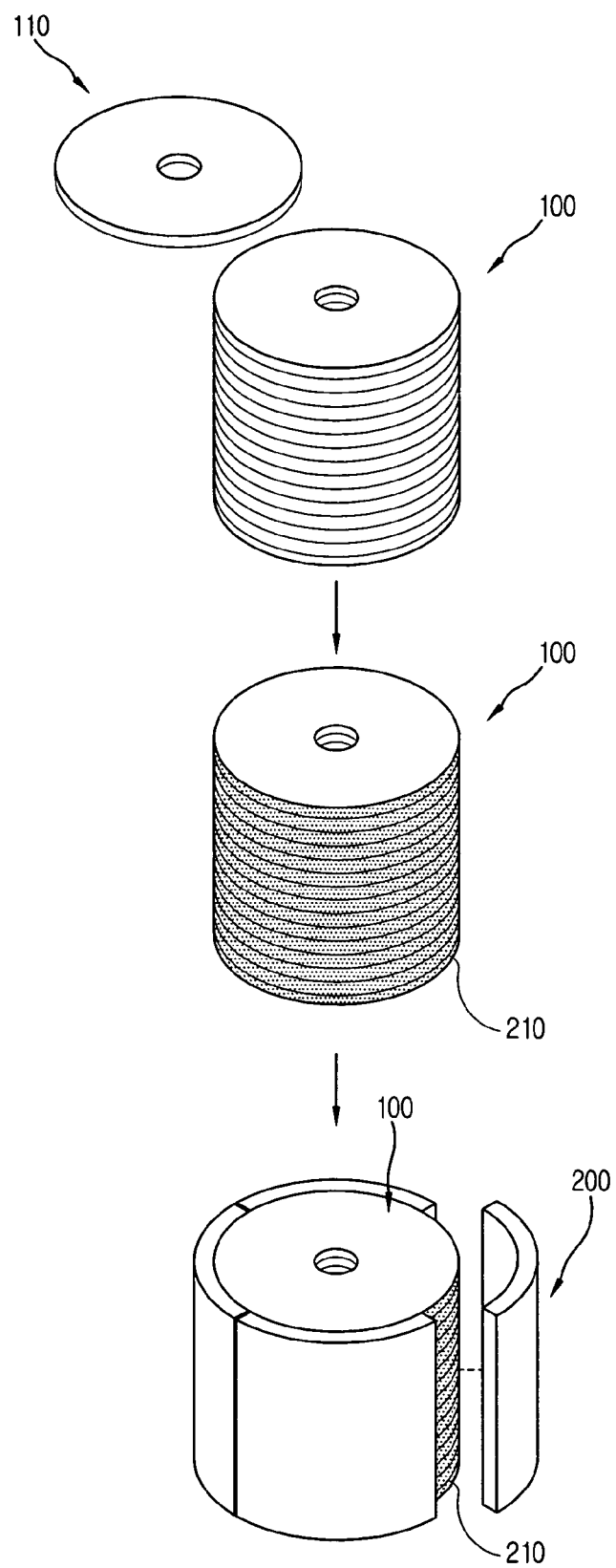
FIG. 3, is a perspective view sequentially illustrating a method for manufacturing the rotor of the BLDC motor.
Figure 4:
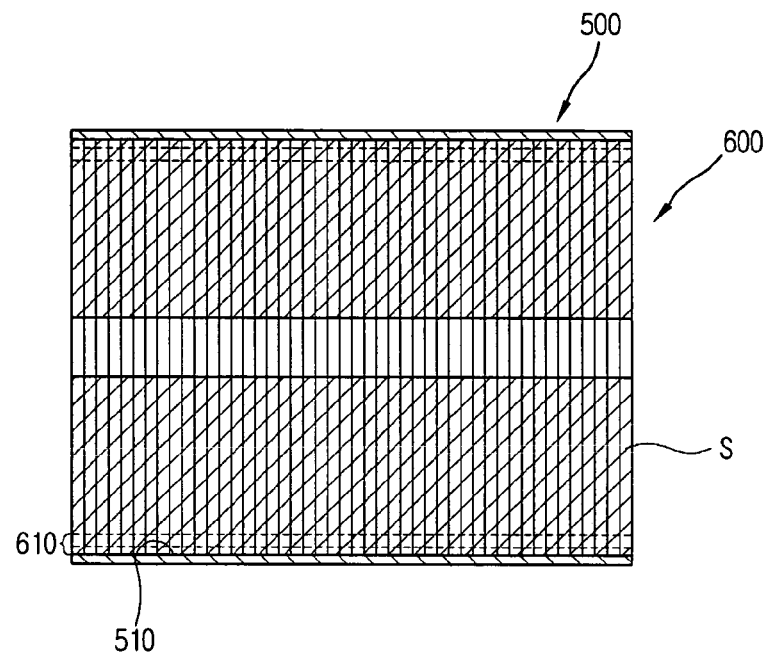
FIGS. 4 and 5 are a front sectional view and a side view illustrating a rotor of a motor in accordance with a first embodiment of the present invention.
Figure 5:
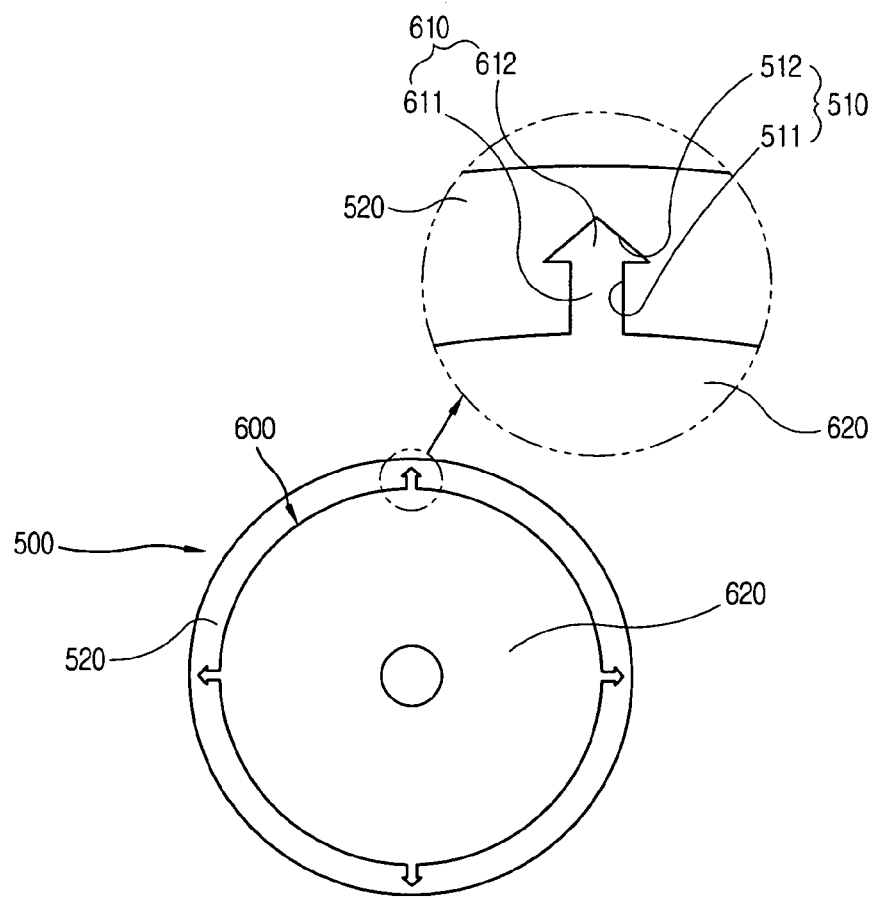

FIG. 4 is a front sectional view illustrating a rotor of a motor in accordance with a first embodiment of the present invention. FIG. 5 is a side sectional view thereof. As illustrated therein, the rotor of the motor of the present invention includes a cylindrical magnet 500 having a plurality of first coupling portions 510 at 25 its inner circumferential surface of a cylindrical shape with a certain thickness, and a rotor core 600 inserted into the cylindrical magnet 500 and having second coupling portions 610 formed at its outer circumferential surface and fixedly coupled with the first coupling portions 510.

The cylindrical magnet 500 includes a hollow cylindrical body 520 having a certain thickness, outer diameter and length, and at least one first coupling portion 510 formed at an inner circumferential surface of the hollow cylindrical body 520. In the illustrated embodiment, there are four first coupling portions 510 formed at regular intervals. In the illustrated embodiment, the first coupling portions 510 have the same shape. However, the number of the first coupling portions 510, the shape of the first coupling portions 510 and the intervals of the first coupling portions 510 are adjustable to provide a secure coupling between the cylindrical magnet 500 and the rotor core 600.

The first coupling portion 510 can be a recess or a protrusion. In this embodiment, the first coupling portion 510 is a recess formed in a groove shape at the inner circumferential surface of the hollow cylindrical body 520. The groove penetrates the hollow cylindrical body 520 from one end to the other end of the hollow cylindrical body 520 along a longitudinal direction of the hollow cylindrical body 520. When the groove is sectioned along the circumferential direction of the hollow cylindrical body 520, the groove in a cross-sectional view includes a groove side parallel portion 511 having a certain width and depth, and a groove side stopping portion 512 communicating with the groove side parallel portion 511 having a triangular shape.

The rotor core 600 includes an filled cylindrical body 620 having an outer diameter corresponding to an inner diameter of the cylindrical magnet 500 and a length corresponding to that of the cylindrical magnet 500, and at least one second coupling portion 610 coupled with the at least one first coupling portion 510. The number of the second coupling portions 610 formed corresponds to that of the first coupling portions 510, and the second coupling portions 610 are formed at regular intervals. In the illustrated embodiment, the first coupling portions 510 have the same shape with each other.

The second coupling portion 610 can be a recess or a protrusion complementary to the first coupling portion 510. In this embodiment, the second coupling portion 610 is a protrusion formed at an outer circumferential surface of the filled cylindrical body 620. The protrusion is formed from one end to the other end of the filled cylindrical body 620 along a longitudinal direction of the filled cylindrical body 620. When the protrusion is sectioned along the circumferential direction of the filled cylindrical body 620, the protrusion in a cross-sectional view includes a protrusion side parallel portion 611 extending from the filled cylindrical body 620 and having a certain width and depth, and a protrusion side stopping portion 612 extending from the protrusion side parallel portion 611 having a triangular shape.

That is, the first coupling portion 510 of the cylindrical magnet 500 is complementary to the second coupling portion 610 of the rotor core 600. If there are a plurality of first coupling portions and second coupling portions, some of the first and second coupling portions may be protrusions and the other of the first and second coupling portions may be recesses.

In an embodiment, the rotor core 600 is a lamination body in which a plurality of thin sheets (S) having a certain thickness are laminated. In the lamination body, the laminated thin sheets (S) are fixedly coupled with each other by bolting or riveting.

When the rotor core 600 is inserted into the cylindrical magnet 500, the rotor core 600 and the cylindrical magnet 500 are coupled with each other. At the same time, the second coupling portions 610 of the rotor core 600 are engaged with the first coupling portions 510 of the cylindrical magnet 500. As the first coupling portions 510 and the second coupling portions 610 are engaged with each other by, forcible fitting, the rotor core 600 and the cylindrical magnet 500 are fixedly coupled with each other.

Figure 6:
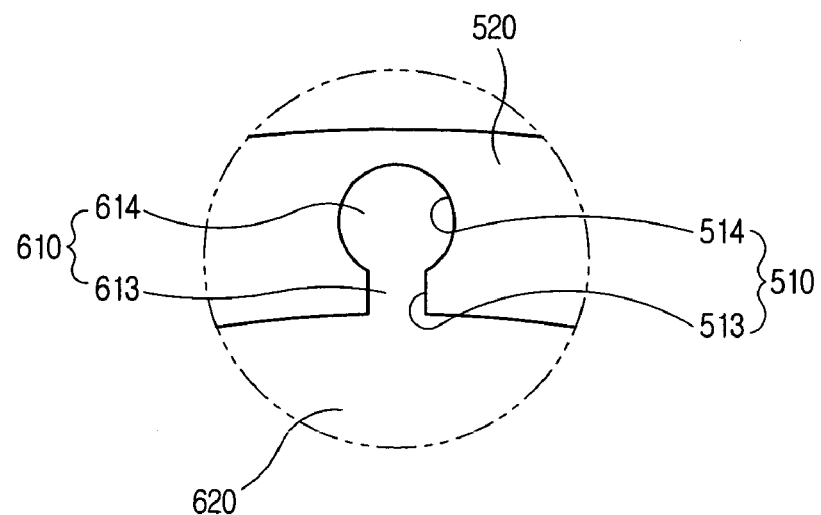
FIG. 6 is a sectional view illustrating one modified example of first coupling portions and second coupling portions of the rotor of the motor in accordance with the first embodiment of the present invention.

Another modified example of the first coupling portions 510 of the cylindrical magnet 500 and the second coupling portions 610 of the rotor core 600 is illustrated in FIG. 6. In this embodiment, the groove in a cross-sectional view includes a groove side parallel portion 513 and a groove side stopping portion 514 communicating with the groove side parallel portion 513 having a circular shape. The protrusion in a cross-sectional view includes a protrusion side parallel portion 613 extending from the outer circumferential surface of the filled cylindrical body 620 and having a certain thickness and length, and a protrusion side stopping portion 614 extending from the protrusion side parallel portion 613 having a circular shape. The first coupling portions 510 of the cylindrical magnet 500 and the second coupling portions 610 of the rotor core 600 can be implemented in various shapes.

Figure 7:
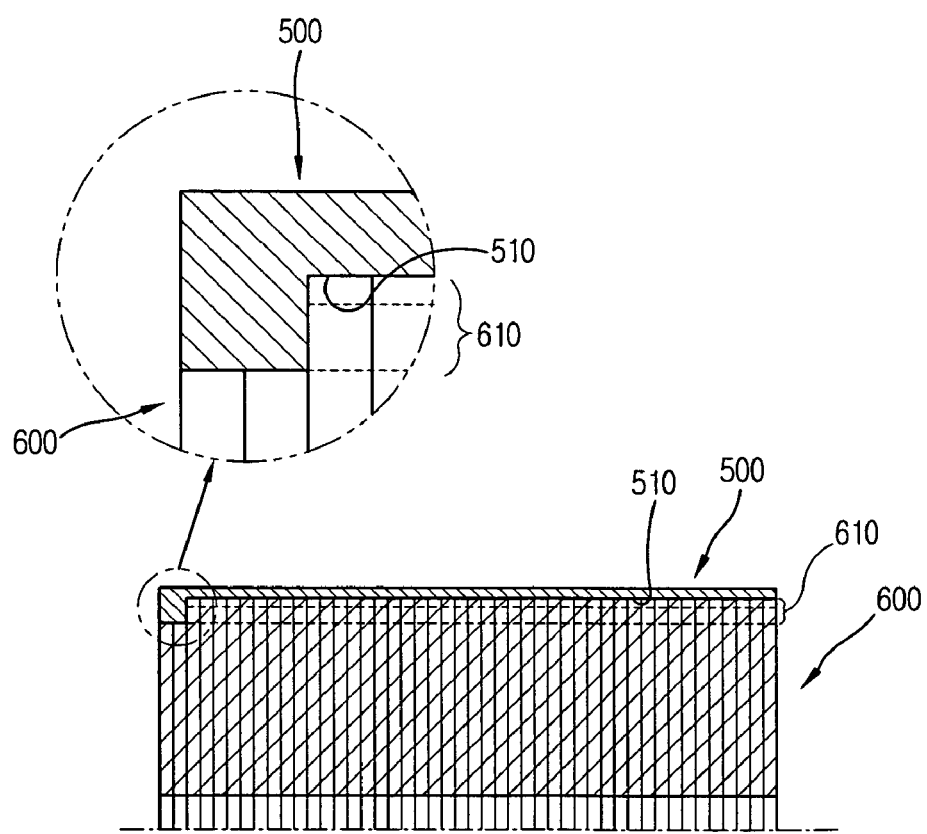
FIG. 7 is a sectional view illustrating another modified example of first coupling portions and second coupling portions of the rotor of the motor in accordance with the first embodiment of the present invention.

In addition, another modified example of the first coupling portions 510 of the cylindrical magnet 500 and the second coupling portions 610 of the rotor core 600 is illustrated in FIG. 7. In this embodiment, the second coupling portion has a protrusion protruding at the outer circumferential surface of the filled cylindrical body 620, and the protrusion is shorter than the filled cylindrical body 620. The first coupling portion has a recess in a groove shape formed at the inner circumferential surface of the hollow cylindrical body 520, and is shorter than the hollow cylindrical body 520.

In the illustrated embodiment, the length of the groove corresponds to that of the protrusion. That is, the groove does not penetrate through the longitudinal direction of the hollow cylindrical body 520 but has one end which stops the protrusion of the rotor core. In this embodiment, the non-recess portion at one end of the cylindrical magnet 500 in the longitudinal direction of the cylindrical magnet 500 holds the protrusion 610 of the rotor core 600 in the longitudinal direction of the rotor core.

The rotor of the motor which is obtained by coupling the rotor core 600 and the cylindrical magnet 500 with each other is inserted into a through hole of a stator (not illustrated).

Figure 8:
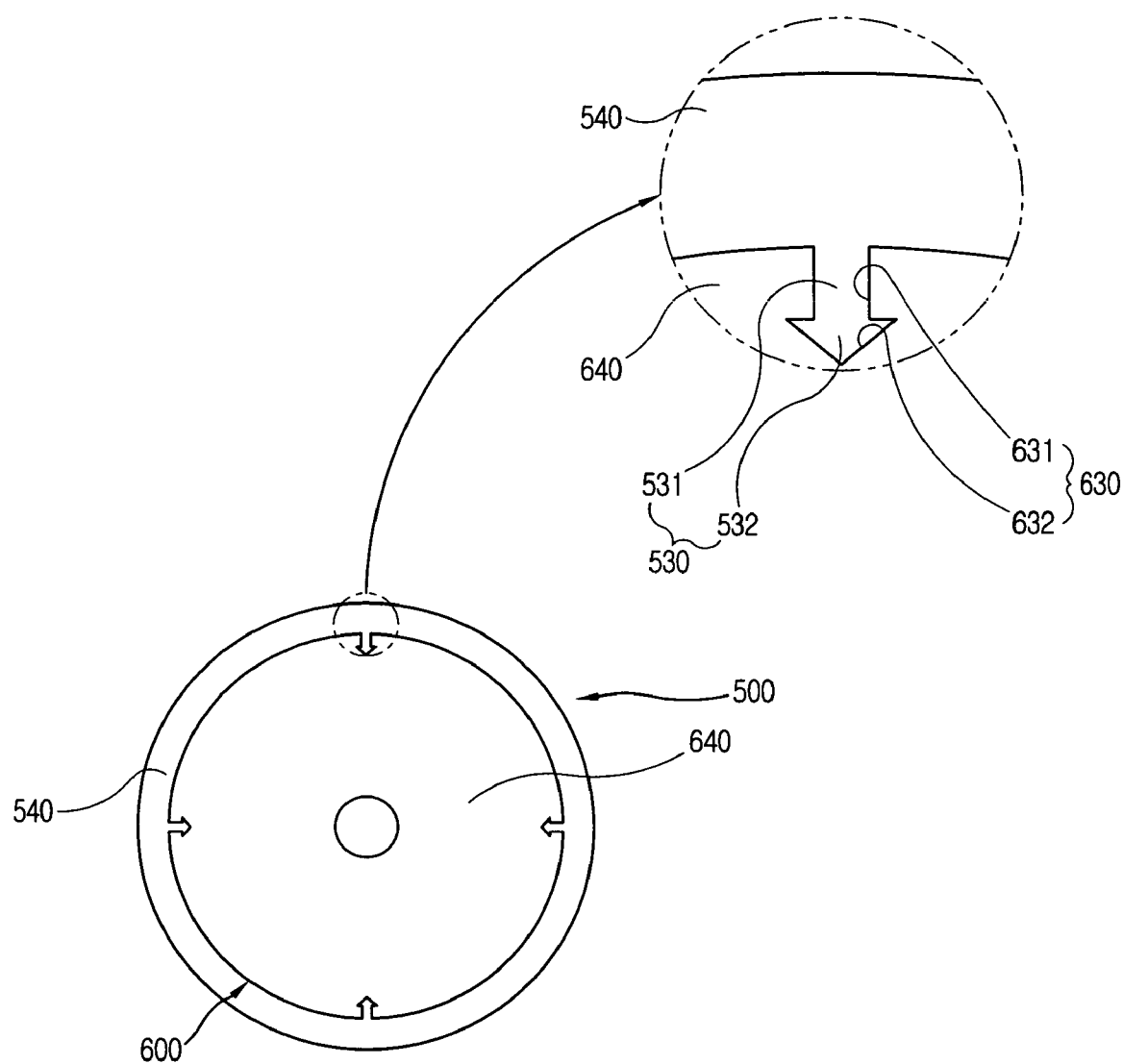
FIG. 8 is a side view illustrating a rotor of the motor in accordance with a second embodiment of the present invention.

FIG. 8 is a side view illustrating a rotor of the motor in accordance with a second embodiment of the present invention. As illustrated therein, the rotor of the motor includes a cylindrical magnet 500 having a plurality of first coupling portions 530 at its inner circumferential surface of a cylindrical shape with a certain thickness, and a rotor core 600 inserted into the cylindrical magnet 500 and having second coupling portions 630 formed at its outer circumferential surface and fixedly coupled with the first coupling portions 530. The first coupling portion 530 has a protrusion, and the second coupling portion 630 has a recess in a groove shape corresponding to the protrusion.

The cylindrical magnet 500 includes a hollow cylindrical body 540 having a certain thickness, outer diameter and length and first coupling portions 530 formed at the inner circumferential surface of the hollow cylindrical body 540. The first coupling portion 530 has a protrusion protruding at the inner circumferential surface of the hollow cylindrical body 540.

The protrusion is formed from one end to the other end in a longitudinal direction of the hollow cylindrical body 540. As the protrusion is sectioned along the circumferential direction of the hollow cylindrical body 540, the protrusion in a cross-sectional view includes a protrusion side parallel portion 531 extending from the inner circumferential surface of the hollow cylindrical body 540 and having a certain thickness and length and a protrusion side stopping portion 532 extending from the protrusion side parallel portion 531 and having a triangular shape.

The rotor core 600 includes an filled cylindrical body 640 having an outer diameter corresponding to an inner diameter of the cylindrical magnet 500 and a length corresponding to that of the cylindrical magnet 500, and a plurality of second coupling portions 630 formed at an outer circumferential surface of the filled cylindrical body 640 and coupled with the first coupling portions 530. The second coupling portion 630 is formed as a recess in a groove shape at the outer circumferential surface of the filled cylindrical body 640.

In this embodiment, the number of the second coupling portions 630 corresponds to that of the first coupling portions 530. The second coupling portions 630 are formed at regular intervals. In addition, the first coupling portions 530 have the same shape with each other.

The groove penetrates the filled cylindrical body 640 from one end to the other end along a longitudinal direction of the filled cylindrical body 640. As the groove is sectioned along the circumferential direction of the filled cylindrical body 640, the groove in a cross-sectional view includes a groove side parallel portion 631 having a certain width and depth and a groove side stopping portion 632 communicating with the groove side parallel portion 631 having a triangular shape.

Figure 9:
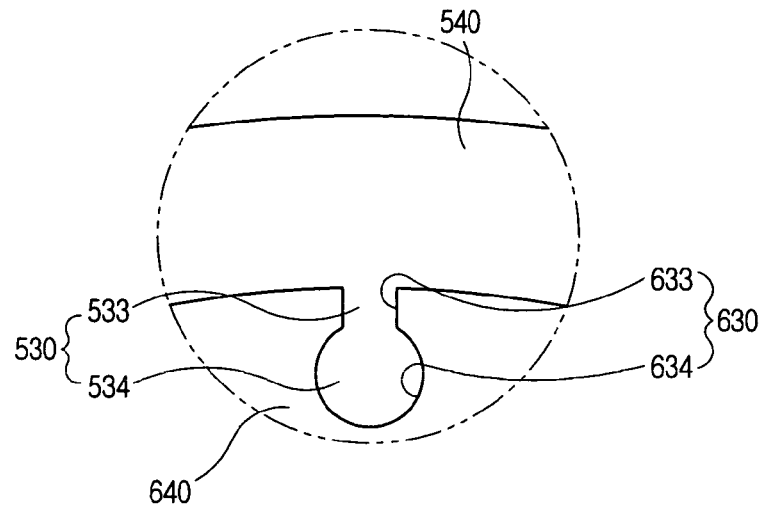
FIG. 9 is a sectional view illustrating a modified example of a first coupling portion and a second coupling portion in accordance with the second embodiment of the present invention.

Another modified example of the first coupling portions 530 of the cylindrical magnet 500 and the second coupling portions 630 of the core 600 is illustrated in FIG. 9. In this embodiment, the protrusion in a cross-sectional view includes a protrusion side parallel portion 533 extending from the filled cylindrical body and having a certain width and depth and a protrusion side stopping portion 534 extending from the protrusion side parallel portion 533 having a circular shape.

The groove in a cross-sectional view includes a groove side parallel portion 633 having a certain width and depth and a groove side stopping portion 634 communicating with the groove side parallel portion 633 having a circular shape.

Figure 10:
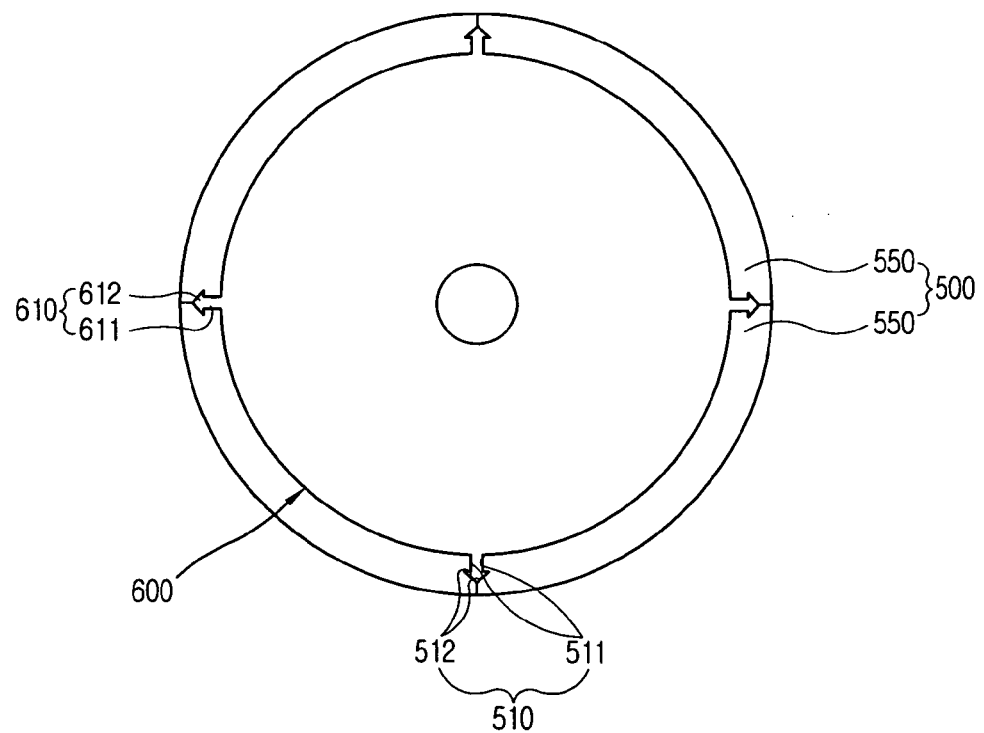
FIG. 10 is a side view illustrating a rotor of the motor in accordance with a third embodiment of the present invention.

FIG. 10 is a side view illustrating a rotor of the motor in accordance with a third embodiment of the present invention. As illustrated therein, in the rotor of the motor, the first cylindrical magnet 500 is divided into a plurality of parts based on the center of each of the first coupling portions 510 in the above-described first embodiment. Both ends of each sectional type magnet 550 having a circular arc are fixedly coupled with the second coupling portions 610. The first coupling portion 510 is divided in the longitudinal direction of the cylindrical magnet 500.

Two adjacent magnets 550 form one first coupling portion at a junction between the two adjacent magnets 550. In the illustrated embodiment, each of the two adjacent magnets 550 has a half portion of the first coupling portion at one end and another half portion of the first coupling portion at the other end. In this embodiment, the first coupling portion is a recess. However, the first coupling portion may also be a protrusion formed by two adjacent magnets 550. Also, if there are a plurality of first coupling portions, some of the first coupling portions may be protrusions and the other of the first coupling portions may be recesses.

Figure 11:
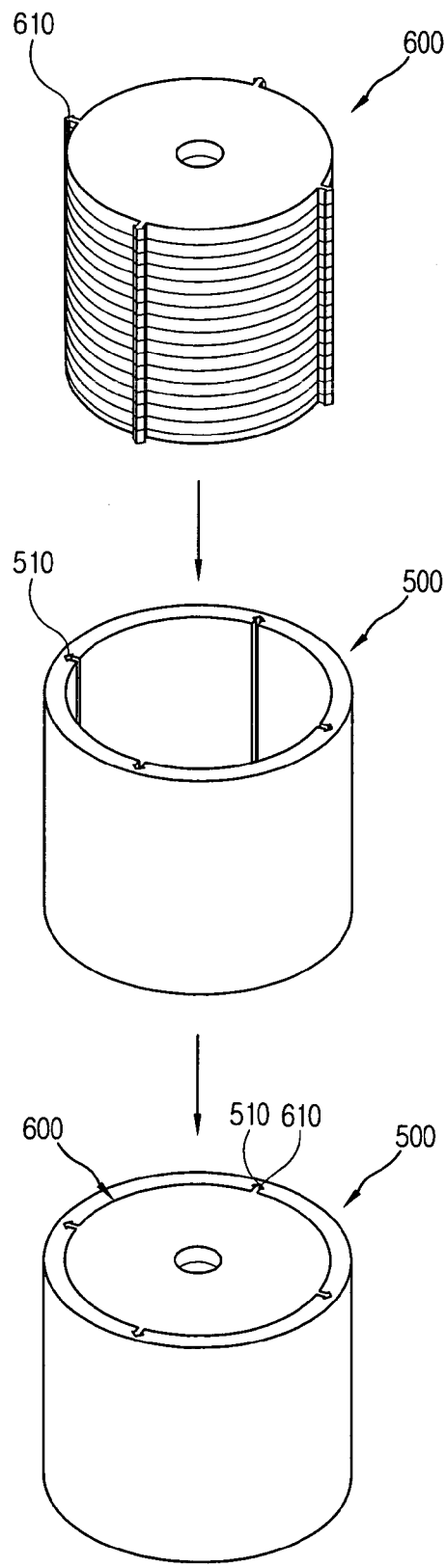
FIG. 11 is a perspective view schematically illustrating a method for manufacturing the rotor of the motor in accordance with an embodiment of the present invention.

FIG. 11 is a perspective view sequentially illustrating a method for manufacturing the rotor of the motor in accordance with an embodiment of the present invention. As illustrated therein, in the method for manufacturing the rotor of the motor, the cylindrical magnet 500 is formed to have a plurality of first coupling portions 510 having a recess in a groove shape at an inner circumferential surface of a hollow cylindrical body with a certain.

The rotor core 600 is formed to have a plurality of protruding second coupling portions 610 to be coupled with the first coupling portions 510 at its outer circumferential surface by laminating a plurality of thin sheets (S) having a predetermined shape and fixedly coupling the thin sheets (S) with each other. The thin sheets (S) constituting the lamination body are fixed by bolting or riveting.

Subsequently, the rotor core 600 and the cylindrical magnet 500 are engaged with each other such that the first coupling portions 510 and the second coupling portions 610 are engaged with each other and fixed.

The illustrated embodiments reduce the manufacturing time by excluding the use of an adhesive and the time to dry the adhesive because the cylindrical magnet 500 and the rotor core 600 are coupled with each other by engaging a plurality of first coupling portions 510 formed on the cylindrical magnet 500 and a plurality of second coupling portions 610 formed on the rotor core 600. In addition, since some of the illustrated embodiments include one cylindrical magnet 500 and one rotor core 600, the number of assembly parts is reduced and assembly operation is simplified, thereby reducing manufacturing time.

In the illustrated embodiments, the cylindrical magnet 500 has the cylindrical shape. In addition, the cylindrical magnet 500 and the rotor core 600 are coupled with each other as the first coupling portions 510 formed on the cylindrical magnet 500 and a plurality of second coupling portions 610 formed on the rotor core 600 are engaged with each other. Thus, the two components are firmly coupled with each other to thereby prevent the two components from being separated from each other during the operation of the motor. In addition, since the use of the adhesive is excluded, the contact between the rotor and the stator due to the protrusion of the adhesive is prevented. Also, since the magnet has a cylindrical shape, an interval between the outer circumferential surface of the rotor and an inner wall of the through hole of the stator into which the rotor is inserted is minimized.

As described, the rotor of the motor and the manufacturing method thereof of as illustrated can increase assembly productivity because of the reduction in time for manufacturing the rotor of the motor, and can reduce the unit cost of assembly because of the reduction of the number of assembly parts.

In addition, since the rotor core 600 and the cylindrical magnet 500 are firmly coupled with each other, separation of parts and damage to parts may be prevented. Accordingly, the product reliability can be increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotor of a motor, comprising:
   a cylindrical magnet having at least one first coupling portion at an inner circumferential surface of the cylindrical magnet; and
   a rotor core coupled with the cylindrical magnet, the rotor core having at least one second coupling portion at an outer circumferential surface of the rotor core, the at least one second coupling portion being engaged with the corresponding at least one first coupling portion,
   wherein the cylindrical magnet includes a plurality of pieces surrounding the outer circumferential surface of the rotor core, two adjacent pieces of the cylindrical magnet forming the at least one first coupling portion at a junction between the two adjacent pieces.

2. The rotor of claim 1, wherein the at least one first coupling portion is one of a recess and a protrusion at the inner circumferential surface of the cylindrical magnet, and the at least one second coupling portion is the other one of the recess and the protrusion engaged with the corresponding at least one first coupling portion.

3. The rotor of claim 2, wherein the recess is complementary to the corresponding protrusion to receive the corresponding protrusion.

4. The rotor of claim 2, wherein the two adjacent pieces of the cylindrical magnet form the one of the recess and the protrusion at the junction between the two adjacent pieces.

5. The rotor of claim 4, wherein each of the two adjacent pieces has a half portion of the one of the recess and the protrusion at one end corresponding to the junction.

6. The rotor of claim 2, wherein the recess has a recess extending portion and a recess stopping portion, the recess extending portion extending from one of the inner circumferential surface of the cylindrical magnet and the outer circumferential surface of the rotor core, the recess stopping portion extending from an end of the recess extending portion.

7. The rotor of claim 6, wherein the protrusion has a protrusion extending portion and a protrusion stopping portion, the protrusion extending portion extending from the other one of the inner circumferential surface of the cylindrical magnet and the outer circumferential surface of the rotor core, the protrusion stopping portion extending from an end of the protrusion extending portion.

8. The rotor of claim 7, wherein the protrusion extending portion is substantially straight, and the protrusion stopping portion has one of a substantially circular shape and a substantially triangular shape.

9. The rotor of claim 6, wherein the recess extending portion is substantially straight, and the recess stopping portion has one of a substantially circular shape and a substantially triangular shape.

10. The rotor of claim 2, wherein the recess and the protrusion are respectively along a longitudinal direction of one of the cylindrical magnet and the rotor core.

11. The rotor of claim 10, wherein the recess and the protrusion respectively have a same length as a length of the one of the cylindrical magnet and the rotor core in the longitudinal direction of the one of the cylindrical magnet and the rotor core.

12. The rotor of claim 10, wherein the recess and the protrusion respectively have a shorter length than a length of the one of the cylindrical magnet and the rotor core in the longitudinal direction of the one of the cylindrical magnet and the rotor core.

13. A rotor of a motor, comprising:
    a cylindrical magnet having at least one first coupling portion at an inner circumferential surface of the cylindrical magnet; and
    a rotor core coupled with the cylindrical magnet, the rotor core having at least one second coupling portion at an outer circumferential surface of the rotor core, the at least one second coupling portion being engaged with the corresponding at least one first coupling portion, wherein the first coupling portion is formed in a recess which has a recess extending portion and a recess stopping portion, and the second coupling portion is formed in a protrusion which has a protrusion extending portion and a protrusion stopping portion, wherein the recess extending portion is substantially straight and the recess stopping portion has a substantially triangular shape, and the protrusion extending portion is substantially straight and the protrusion stopping portion has a substantially triangular shape.

14. A rotor of a motor, comprising:

a cylindrical magnet having at least one first coupling portion at an inner circumferential surface of the cylindrical magnet; and a rotor core coupled with the cylindrical magnet, the rotor core having at least one second coupling portion at an outer circumferential surface of the rotor core, the at least one second coupling portion being engaged with the corresponding at least one first coupling portion, wherein the first coupling portion is formed in a recess which has a recess extending portion and a recess stopping portion and the second coupling portion is formed in a protrusion which has a protrusion extending portion and a protrusion stopping portion, wherein the recess extending portion is substantially straight and the recess stopping portion has a substantially circular shape, and the protrusion extending portion is substantially straight and the protrusion stopping portion has one of a substantially circular shape.

* * * * *